(12) United States Patent
Cumin et al.

(10) Patent No.: US 11,442,968 B2
(45) Date of Patent: Sep. 13, 2022

(54) METHOD FOR LOCATING SENSORS

(71) Applicant: Orange, Issy-les-Moulineaux (FR)

(72) Inventors: Julien Cumin, Chatillon (FR); David Cibaud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/715,619

(22) Filed: Dec. 16, 2019

(65) Prior Publication Data
US 2020/0192919 A1 Jun. 18, 2020

(30) Foreign Application Priority Data
Dec. 17, 2018 (FR) ........................................ 1873114

(51) Int. Cl.
*G06F 16/00* (2019.01)
*G06F 16/29* (2019.01)
*G06F 16/28* (2019.01)

(52) U.S. Cl.
CPC ............ *G06F 16/29* (2019.01); *G06F 16/285* (2019.01)

(58) Field of Classification Search
CPC ............... G06F 2201/86; G06F 11/302; G06F 11/3072; G06F 11/3438; G06F 11/3452; G06F 11/3466; G06F 21/316; G06F 21/552; G06F 2201/865; G06F 2201/88; G06F 2221/2111; G06F 2221/2129; G06F 2221/2151; G06F 9/542; G06F 16/27; G06F 1/1694; G06F 2009/45575; G06F 2009/45587; G06F 21/44; G06F 21/53; G06F 21/57; G06F 2209/5017; G06F 2209/503; G06F 2209/509; G06F 2209/541; G06F 2209/549; G06F 3/011; G06F 8/30; G06F 8/35; G06F 8/36; G06F 8/60; G06F 8/70; G06F 9/4406; G06F 9/5027; G06F 40/10; G06F 40/106; G06F 40/205; G06F 8/41; G06F 1/163; G06F 1/1652;
(Continued)

(56) References Cited
U.S. PATENT DOCUMENTS
6,529,164 B1  3/2003  Carter
2008/0281472 A1* 11/2008  Podgorny .............. G05B 15/02
                                               700/276
(Continued)

OTHER PUBLICATIONS
English translation of the French Written Opinion dated Oct. 14, 2019 for corresponding French Application No. 1873114, filed Dec. 17, 2018.
(Continued)

*Primary Examiner* — Shyue Jiunn Hwa
(74) *Attorney, Agent, or Firm* — David D. Brush; Westman, Champlin & Koehler, P.A.

(57) ABSTRACT
A method for locating sensors situated in a geographical area including of at least one reference sub-area. the sensors include: at least one first sensor, each first sensor being associated with a reference sub-area in which it is situated; and at least one second sensor, each second sensor not being associated with any sub-area. The method includes: grouping the sensors into a plurality of groups based on data from the sensors; for at least one group of sensors, determining whether the group includes a first sensor; an if the group includes a first sensor, associating each second sensor of the group with the sub-area corresponding to the first sensor.

10 Claims, 5 Drawing Sheets

(58) Field of Classification Search
CPC .. G06F 11/3006; G06F 21/335; G06F 21/445; A63B 2225/50; G06Q 10/0639; G06Q 30/0201
See application file for complete search history.

(56) References Cited

U.S. PATENT DOCUMENTS

| | | |
|---|---|---|
| 2012/0086568 A1 | 4/2012 | Scott et al. |
| 2014/0210616 A1* | 7/2014 | Ramachandran .. G08B 21/0227 340/539.13 |
| 2017/0270183 A1* | 9/2017 | Kuroda ............... G06F 16/2477 |

OTHER PUBLICATIONS

French Search Report and Written Opinion dated Oct. 14, 2019 for corresponding French Application No. 1873114, filed Dec. 17, 2018.
Gauger M. et al., "Sensor-Based Clustering for Indoor Applications", Sensor, Mesh and Ad Hoc Communications and Networks, 2008. SENCON '08. 5th Annual IEEE Communications Society Conference On, IEEE, Piscataway, NJ, USA< Jun. 16, 2008 (Jun. 16, 2008), pp. 478-486, XP031282624.
Crul Stijn et al., "Improved commissioning in indoor wireless networks through sensor fusion using clustering", 2018 IEEE Sensors Application Symposium (SAS), IEEE, Mar. 12, 2018 (Mar. 12, 2018), pp. 1-6, XP033345780.

\* cited by examiner

METHOD FOR LOCATING SENSORS

FIELD

The present disclosure relates to the field of locating objects, in particular fixed objects, in an environment (such as a house, a room of a house, an apartment, an office, etc.), in particular in a smart environment.

BACKGROUND

A smart environment comprises a network of sensors which provide information concerning values, for example physical values (ambient brightness, temperature, power consumption, etc.), a state (movement, presence of an individual in a room), and possibly actuators able to perform tasks based on the information provided by the sensors (controlling the thermostat to increase the temperature of a room, controlling a switch to turn off a light, etc.).

For some applications, it is important to know the location of the sensors or actuators in the network of objects. For example, in the context of a business building, knowledge of the position of the sensors is essential for services such as managing the distribution of energy consumption to the various rooms of the building, occupancy of the conference rooms of the building, etc. In the context of home automation, sensor location information makes certain services more reliable, such as activity recognition, detection of an individual's presence, intrusion detection, etc.

In existing solutions, sensor and/or actuator location information is obtained from data provided by individuals, for example an authorized professional who has performed or supervised the installation of objects in the network, or the user himself. Such solutions can be expensive (particularly in the first case), and very time-consuming, as the number of objects can be very high and the area to be covered can be very large. In addition, with each change in the network configuration (particularly when a new network node is installed or when an existing node is moved), it is necessary to update this location information. Such updating is tedious and generates errors, especially when the number of connected objects is high, and requires careful tracking which the user does not necessarily want or have the time to perform.

The solutions developed for tracking mobile objects could be adapted to the locating of connected and fixed objects. However, current solutions for such tracking are usually based on the use of beacons. For example, in U.S. Pat. No. 6,529,164 B1, a system is proposed for locating people equipped with transceivers inside a building. To achieve this, beacons are placed in the building, and intermittently transmit unique identification codes. The transceivers receive transmissions from nearby beacons, determine the signal strength of these transmissions, and transmit the associated data to a server. The server uses these data to determine the location of each transceiver and uses the expected travel times between specific locations to resolve ambiguities.

However, such solutions require installing, in addition to the objects to be located, beacons within the area to be controlled. Such installation represents significant costs in labor, configuration, and maintenance, especially in large buildings such as corporate offices. In addition, these solutions rely on measurements of the signal strength of the received signal throughout the building, which is also expensive. In addition, to use these solutions, it is necessary to know the location of the beacons inside the building and to update the location information when a beacon is added, removed, or moved. This location information is generally obtained from data provided by individuals (authorized professional or user), which returns to the problem defined above.

There is therefore a need for an efficient solution for the automatic acquisition of the physical position of nodes (i.e. sensors and/or actuators) in a network of sensors. The present disclosure improves the situation.

SUMMARY

The present disclosure concerns a method, implemented by computer means, for locating sensors situated in a geographical area, said geographical area consisting of at least one reference sub-area, said sensors comprising:

at least one first sensor, each first sensor among said at least one first sensor being respectively associated with a sub-area among said at least one reference sub-area in which it is situated; and at least one second sensor, each second sensor among said at least one second sensor not being associated with any sub-area;

the method comprising:

a. grouping said sensors into a plurality of groups based on data from said sensors, by partitioning said data;

b. for at least one group of sensors among the plurality of groups, determining whether or not the group comprises a first sensor; and c. if the group comprises a first sensor, associating each second sensor of the group with the sub-area with which the first sensor is associated.

"Geographical area" is understood to mean a spatial area which corresponds to a particular environment, such as a house, a building, an apartment, an office, etc. "Sub-area" is understood to mean a spatial region included in the geographical area, for example a room or a set of rooms. For example, sub-areas form a partition of the geographic area. "Reference sub-area" is understood to mean that the sub-areas are predefined or predetermined according to the desired application (for example, depending on the desired accuracy, a sub-area may correspond to an entire floor or to a single room). For example, the sub-areas may be predefined by the user, by the network installer, by a person in charge of implementing a technical solution (for example optimization of electricity consumption) in the geographical area.

It is assumed that the location (i.e. the geographical sub-area in which a sensor is situated) of certain sensors is known (for example, it has been specified by the network installer, by a user, or by a external entity), while the location of some sensors is unknown. The "first sensors" thus designate the sensors whose location is known, and the "second sensors" designate sensors whose location is unknown.

"Data partitioning" is understood to mean any data analysis technique for separating a set of data into homogeneous "packets" in the sense that the data of each packet share common characteristics, established on the basis of proximity criteria. For example, such a data analysis technique may include the application of an unsupervised classification algorithm.

Sensor grouping is carried out based on the data from the sensors, and the known location information is propagated to the other sensors of a same group.

In one embodiment, step c may further comprise: if the group does not comprise any first sensor, issuing a signal relating to a sub-area in which a sensor of the group of sensors is situated.

For example, if a group has no sensor whose location is known, it is possible to send a signal to an external entity to request location information relating to one of the group sensors (for example, a command inviting a user to enter the location of a given sensor). In this case, the method may further comprise:

subsequent to the transmission of the signal, receiving data relating to a sub-area; and associating each sensor of the group with the sub-area corresponding to the received data.

Thus, in response to the transmitted signal, location information can be received for a sensor of the group and propagated to all sensors in the group.

In one embodiment, the method may further comprise:

d. generating a control signal for an electronic device on the basis of at least one sensor and the sub-area associated with it.

The determined location information can be used to control a device. For example, in a context of optimizing energy consumption, the location information can be used to control the temperature and/or brightness of different sub-areas.

In one or more embodiments, for a subset of data among said data from said sensors, each piece of data of the subset is respectively associated with an event time, the partitioning of said data being a function of said event times.

The partitioning method can thus determine groups based on temporal correlations, which make it possible to deduce spatial correlations between the sensors.

In one embodiment, at least one piece of data of the subset of data may come from at least one first sensor among said first sensors. The method may further comprise:

selecting a reference sensor among said at least one first sensor;

determining differences between event times associated with sensors other than the reference sensor and an event time associated with the reference sensor;

wherein the grouping of the sensors is carried out on the basis of the determined differences.

In one or more embodiments, the partitioning of said data is a K-means type of algorithm.

In one or more embodiments, the grouping of the sensors may comprise:

grouping said first sensors into a plurality of first groups, such that all first sensors belonging to a same first group among the plurality of first groups are associated with a same sub-area and such that two first sensors among said first sensors associated with two different respective sub-areas do not belong to a same first group;

on the basis of the data from the sensors, adding a second sensor to a first group among said first groups, or to a created group not comprising any first sensor.

Thus, at the end of the grouping step a, two first sensors (i.e. whose location is known) of a same sub-area are necessarily in the same group, and two first sensors of two different sub-areas are necessarily in two different groups. This increases the robustness of the overall process. The preliminary step of grouping the first sensors can be carried out for example by assigning specific distances between the first sensors: a zero distance can be assigned between two first sensors of a same sub-area, and a very large distance can be assigned between two first sensors of two different sub-areas.

In one or more embodiments, the sensors of the geographical area may belong to a same local area network, and steps a to c may be implemented at each detection of the addition of a new sensor to the local area network and/or each removal of a sensor from the local area network for which data was previously received.

Thus, in the event of a change in the topography of the network, the location information is advantageously updated.

In one or more embodiments, the method may further comprise:

receiving a signal confirming or correcting that a sensor belongs to a sub-area;

updating the groups of sensors and the sub-areas associated with the groups of sensors according to the received confirmation or correction signal.

Such a confirmation signal is received from an external entity, for example a user who manually confirms that a sensor is indeed situated in that sub-area, or who corrects the detected sub-area in the event of an error. This makes it possible to correct any errors during grouping.

In one or more embodiments, the received data may be associated with sensors measuring different physical parameters.

For example, when the data are grouped according to the time an event occurs at a sensor, it is not necessary for the different sensors to correspond to the same physical parameter. This advantageously makes it possible to exploit data from very different and very heterogeneous sensors.

The disclosure also concerns a device for locating sensors situated in a geographical area, said geographical area consisting of at least one reference sub-area, said sensors comprising:

at least one first sensor, each first sensor among said at least one first sensor being respectively associated with a sub-area among said at least one reference sub-area in which it is situated; and at least one second sensor, each second sensor among said at least one second sensor not being associated with any sub-area;

the device comprising a circuit configured to implement one of the methods described above.

For example, the device may be integrated with an electronic device providing access to the Internet.

The present disclosure also concerns a computer program product comprising instructions for implementing one of the methods described above, when this program is executed by a processor.

This program may use any programming language (for example an object language or some other language), and be in the form of interpretable source code, partially compiled code, or fully compiled code.

FIG. 2, described in detail below, can constitute the flowchart of the general algorithm of such a computer program.

Another aspect relates to a non-transitory storage medium for a computer-executable program, comprising a set of data representing one or more programs, said one or more programs comprising instructions for executing all or part of the method described above, when said one or more programs is executed by a computer comprising a processing unit operably coupled to memory means and to an input/output interface module.

BRIEF DESCRIPTION OF THE DRAWINGS

Other features, details, and advantages of the disclosure will be apparent from reading the following detailed description. This is purely illustrative and is to be read with reference to the accompanying drawings in which.

DETAILED DESCRIPTION

Figure 1:
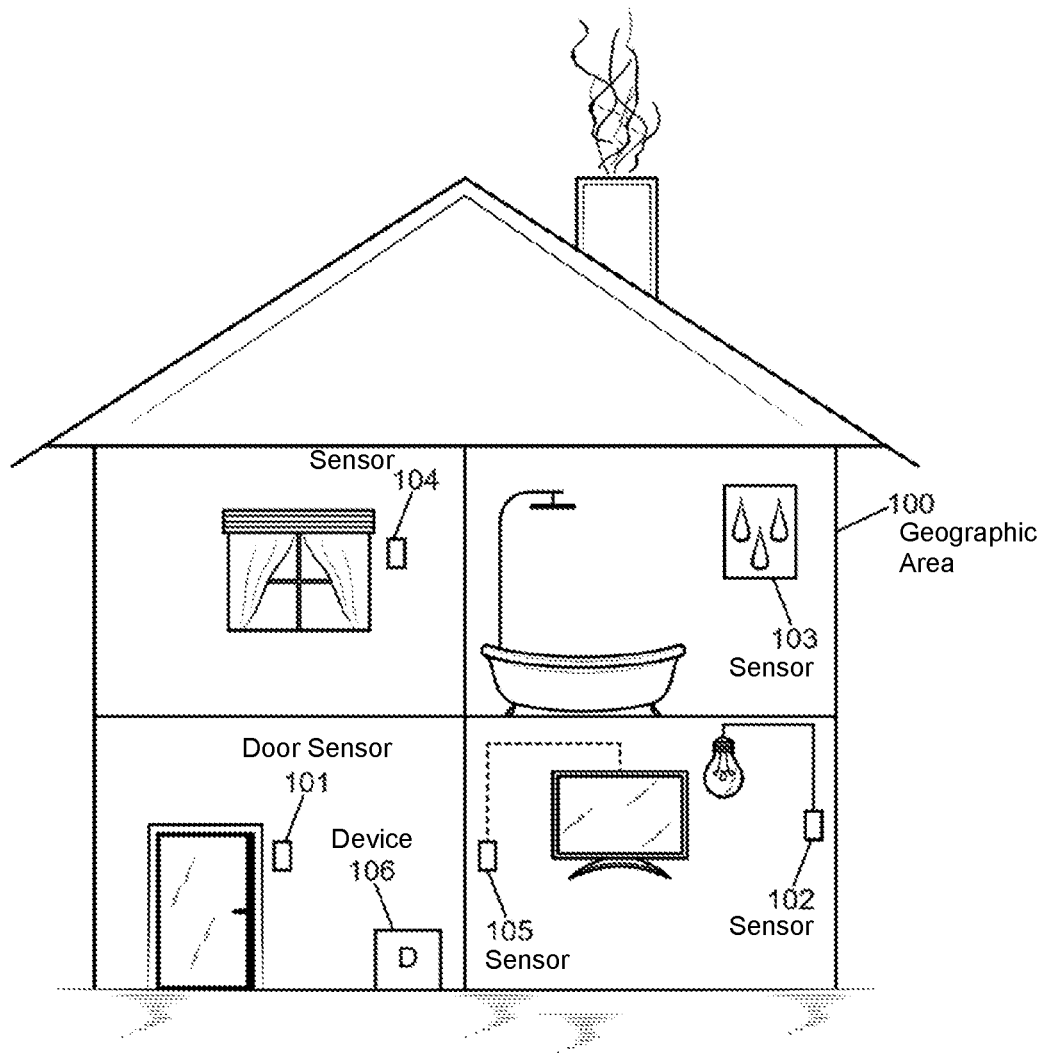
FIG. 1 illustrates a geographical area equipped with a network of sensors in which a sensor location method can be implemented, according to one particular embodiment.

FIG. 1 illustrates a geographical area equipped with a network of sensors in which a sensor location method can be implemented, according to one particular embodiment.

In the example shown in FIG. 1, a geographical area 100 is represented and corresponds in a non-limiting manner to a home equipped with home automation sensors. Of course, the geographical area may correspond to any other environment equipped with sensors, such as a set of offices, an individual office, an apartment, etc.

Sensors 102, 103, 104, 105 able to communicate with a device 106 via a wired and/or wireless communication protocol are situated in a geographical area 100. Some sensors may also be placed at a distance less than a predetermined distance from the geographical area. For example, in FIG. 1, a door opening sensor (or detector) 101 may be placed near the front door, on the facade of the house 100. In other examples, sensors may also be placed in the garden, on the porch, in the garage, etc. The geographical area 100 may comprise several sub-areas. The geographical sub-areas may be predefined according to the desired level of granularity. For example, for some applications, the sub-areas correspond to different rooms in a house, apartment, or office. For other applications, the sub-areas can be sets of rooms, or different floors of a building.

According to one embodiment, certain sensors 101, 102, 103, 104, 105 can measure physical parameters and send data concerning these physical parameters, such as temperature, electricity consumption, water or gas consumption, brightness, sound signal, movement, etc.

Additionally or alternatively, certain sensors 101, 102, 103, 104, 105 can provide "low level" information, meaning simple information not requiring complex computer processing. Typically, these sensors measure a physical quantity and the result of the measurement can be a "YES/NO" type of binary variable modeling an event, for example: triggering a motion sensor ("actuated/non-actuated"), triggering a sensor 101 detecting the opening/closing of a door, an action (turning on or off) on a bulb detected by a sensor 102 in a switch connected to the bulb; an action (turning on or off) on a television detected by a sensor 105 connected to a television; etc.

According to one embodiment, the device 106 is equipped with a communication module comprising one or more wireless receiver(s) configured to receive data from different sensors 101, 102, 103, 104, 105.

The device 106 may be situated inside or outside the geographic area 100. In addition, the device 106 may be an independent device, or may be a device integrated with computer equipment in the geographical area 100. For example, the device 106 may be integrated into an electronic device providing access to the Internet, such as a service gateway, sometimes referred to as a "box" for a residential gateway.

To receive the data from the sensors 101, 102, 103, 104, 105, the device 106 may be equipped with an electronic communication circuit for communicating according to a protocol adapted to the technology of connected objects.

Such an electronic communication circuit may be for example a PAN communication circuit (for "Personal Area Network"), which allows communications over distances ranging from a few centimeters to about ten meters depending on the technology used. For example, the PAN electronic communication circuit may use one or more communication technologies among Wifi, Bluetooth, Infrared, and NFC technologies for a Wireless Personal Area Network (WPAN), or Zigbee, Enocean, Z-Wave for a Low Power Wireless Personal Area Network (LPWPAN).

The electronic communication circuit may also use an LPWAN (Low-Power Wide Area Network), which allows long-range communications at very low bit rate. This type of network is particularly suitable for M2M ("Machine to Machine") or "IoT" (Internet of Things) applications, which are generally limited in terms of memory capacity, computing power, and energy. For example, the electronic circuit may use a network among: Sigfox, LTE-M, or LoRaWAN.

The device 106 may be suitable for processing the data received from the various sensors 101, 102, 103, 104, 105 in order to deduce their locations within the geographical area 100, in other words to determine the sub-area in which they are situated.

It is assumed that all sensors in the network are connected to the device 106 regardless of the protocol used. It is also assumed that the sensors 101, 102, 103, 104, 105 are divided into two categories: sensors whose location (in a sub-area) is not known, and sensors whose location in a sub-area is known (for example, it has been specified by the network installer or by the user).

Figure 2:
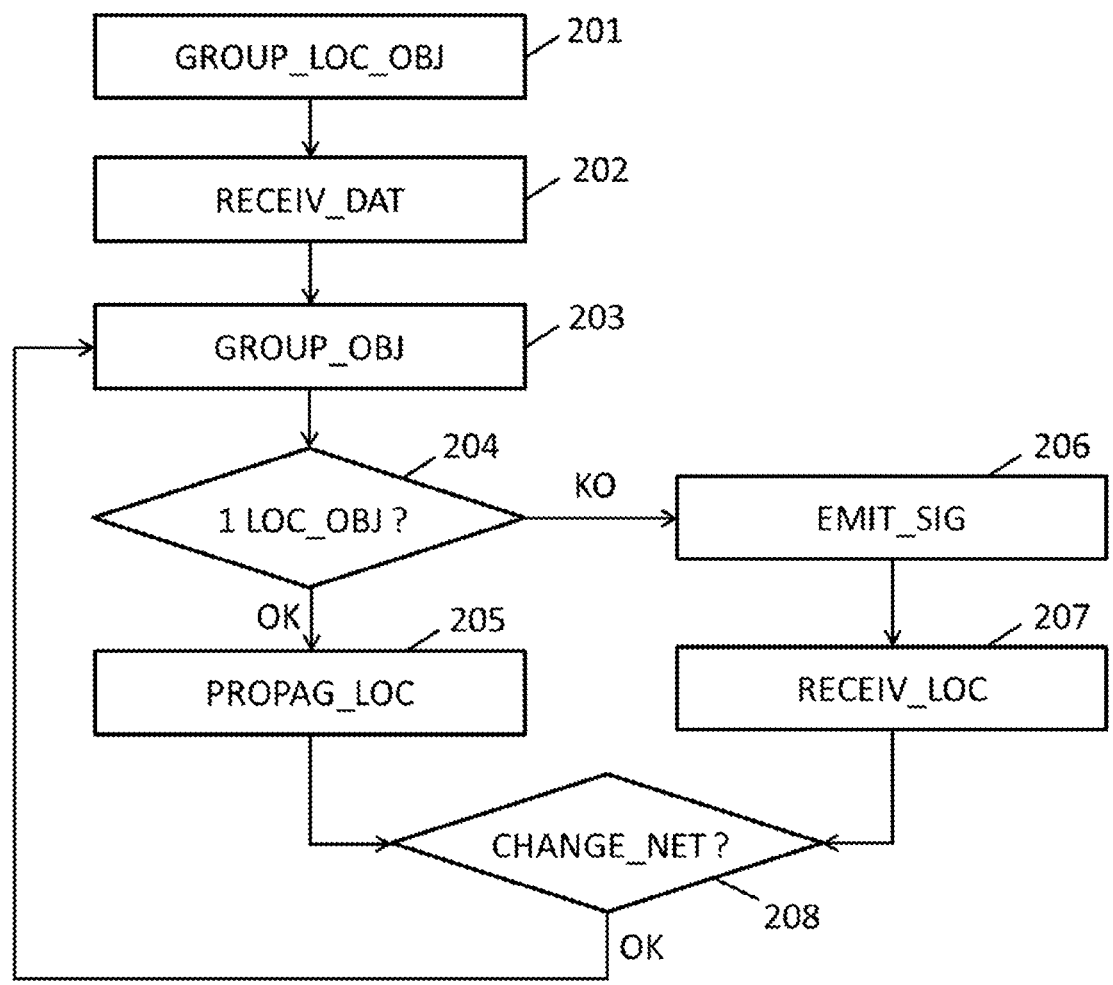
FIG. 2 is a flowchart for determining a location of a sensor in one particular embodiment.

FIG. 2 is a flowchart for determining a location of a sensor in one particular embodiment.

In one embodiment, the sensors whose location is known are distributed (step 201) into different groups according to their location in a sub-area. For example, all sensors in sub-area 1 are assigned to a group 1, all sensors in sub-area 2 are assigned to a group 2, and so on. All sensors in a group have the same location, and two sensors at different locations belong to two different groups.

In one or more embodiments, the method for determining the location of a sensor comprises receiving data from different sensors. It should be noted that this receiving is optional. Indeed, it is also possible to determine information about the location of sensors from the fact that no data is received, for a group of sensors, during a time interval. For example, if the device receives information from an external system indicating that there is a network outage or a power outage in one or more sub-areas, and that in parallel the device does not receive any data from a subset of the sensors for a certain amount of time, this may indicate that the sensors of this subset are situated in the sub-area or sub-areas concerned by the outage. Conversely, receiving data from sensors during the outage indicates that these sensors are not situated in the sub-area or sub-areas affected by the outage.

The data received in step 202 may for example be binary variables or data relating to measurements of physical parameters, as mentioned above.

In step 203, a data partitioning method (or algorithm) is implemented based on the received data (or information derived from the fact that no data is received). The analysis of these data can be done over a short or long period of time, and makes it possible to determine correlations between sensors. By using a suitable metric, these correlations allow establishing spatial correlations between the sensors. The data partitioning algorithm can thus group sensors that are spatially close into the same group. According to one or more embodiments, the partitioning algorithm can be an unsupervised learning algorithm, for example a k-means algorithm, a density-based spatial clustering of applications with noise (DBSCAN), a hierarchical grouping method, etc. In one or more embodiments, the partitioning algorithm can be probabilistic (for example using an expectation-maximization algorithm, or EM), and output the groups as well as the probability or probabilities that a sensor belongs to one or more groups. If all probabilities for a sensor are below a predefined threshold, it may be decided for example not to assign the sensor to any group and to wait for additional data in order to refine the grouping, or to send a signal to an external entity or a user to obtain information about the sensor. Such probabilistic information gives a level of confidence associated with the grouping done.

When a step 201 of performing a preliminary grouping of sensors whose location is known has been carried out, this preliminary grouping can be used to initialize the group 203 of all sensors. More specifically, when grouping 203 all the sensors, it can be decided that the sensors whose location is known remain assigned to their respective initial groups. Sensors whose location is unknown can be assigned either to an initial group established during the preliminary grouping 201, or to a group newly created during the data partitioning algorithm of step 203 (for example, when the sensor is too far away from all the initial groups).

When all the groups have been created, it is determined 204, for each group G, whether or not this group contains a sensor whose location is known.

This determination 204 can be made for example based on the identifiers of the sensors. For example, with each installation of a new sensor whose location is indicated, the identifier of the sensor and the sub-area in which the sensor is situated may be stored in a lookup table, for example in a memory of the device which implements the location method, or in an external memory to which the device has access. When receiving data from this sensor, the device receiving the data also receives the sensor identifier, and can determine from the lookup table whether the location of this sensor is known, and where appropriate the sub-area in which this sensor is situated.

If the group G comprises at least one sensor C whose location is known ("OK" in FIG. 2), the location information for this sensor C (i.e. the sub-area in which it is situated) is propagated 205 to all other sensors of the group whose location is unknown. In other words, all sensors of the group G whose location is unknown are associated with the sub-area of sensor C (and therefore are located in the sub-area corresponding to C).

It should be noted that the optional initialization step 201 ensures that two sensors C1 and C2 whose locations are known and having two different locations cannot be found in the same group G during the grouping step 203.

When this initialization step 201 is not performed, it is theoretically possible that two sensors C1 and C2 whose locations are known and have two different locations are in the same group G during the analysis. To avoid this, in one embodiment it is possible to assign specific distances to the sensors whose locations are known. For example, when the data partitioning algorithm used in step 203 is based on mathematical distances, the distance between two sensors having two different locations can be set to be very large, and the distance between two sensors having the same location to be very small or zero. In another embodiment, it is possible to perform a test at the end of the grouping step 203 to determine whether a group comprises two sensors whose locations are known and different. If such is the case, it may be decided to redefine the sub-areas, or to wait to receive additional data from the sensors in order to restart the grouping algorithm, etc.

If the group G does not comprise any sensor whose location is known ("KO" in FIG. 2), a signal can be sent 206 to an external entity (for example, an installer or an individual, or another computer system) to request information about the location of a sensor in the group G (which therefore contains only sensors whose location is unknown). If such information is received 207, then all sensors of the group G are associated with the location indicated in this information.

Once each sensor is integrated into a group, an optional step (not shown in FIG. 2) aims to verify the consistency of the sensor location information. An external entity (for example an installer or an individual, or another computer system) can change the location of one or more sensors if necessary (for example, to correct a system error or to provide new more reliable information).

According to one embodiment, the method may include a step in which it is determined whether a change is being made to the local area network to which the sensors are connected. This change may correspond, for example, to the detection of a new sensor on the network, a change in the configuration of a sensor in the network, a removal of a sensor from the network, etc. When such a change is detected ("OK"), grouping step 203 (as well as the subsequent steps) can be repeated. Additionally or alternatively, new iterations of the grouping step 203 may be performed in a predetermined time sequence.

The locations of the various sensors can be used for sending a control signal to a device. For example, once the location of a thermostat is determined, it is possible to command a temperature change in accordance with the desired temperature in the corresponding sub-area.

Figure 3A:
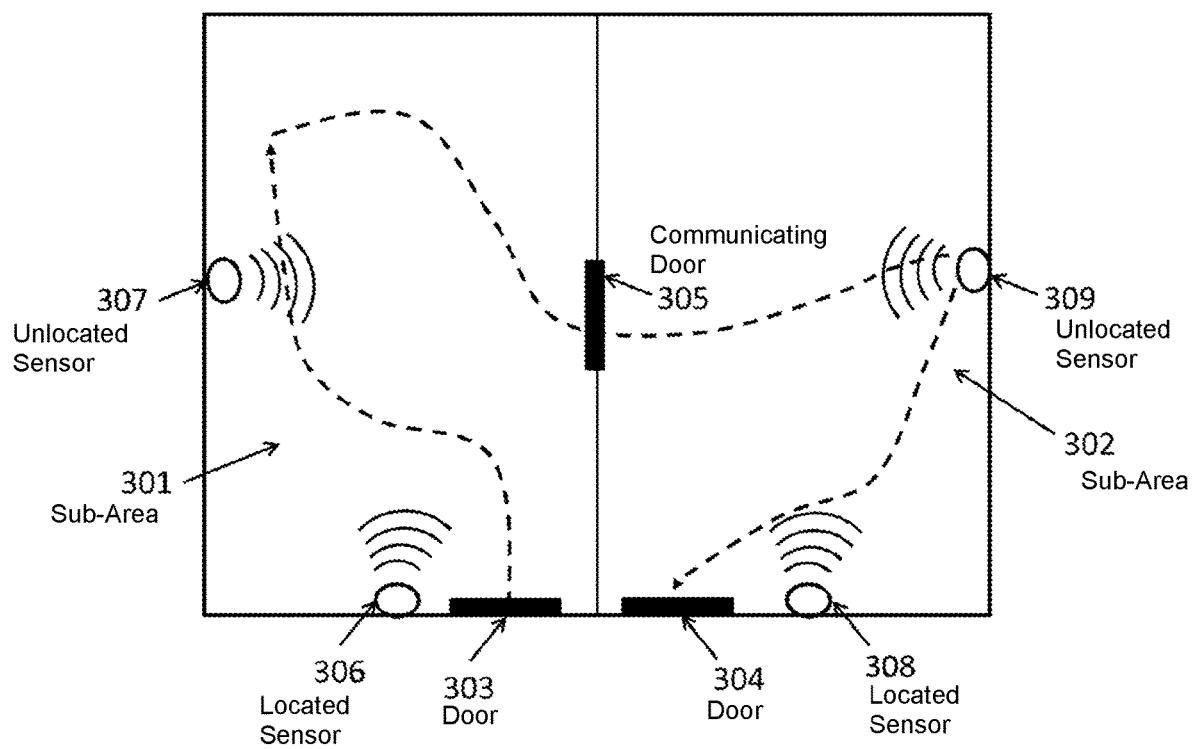
FIG. 3a represents a sensor grouping according to one particular embodiment.
Figure 3B:
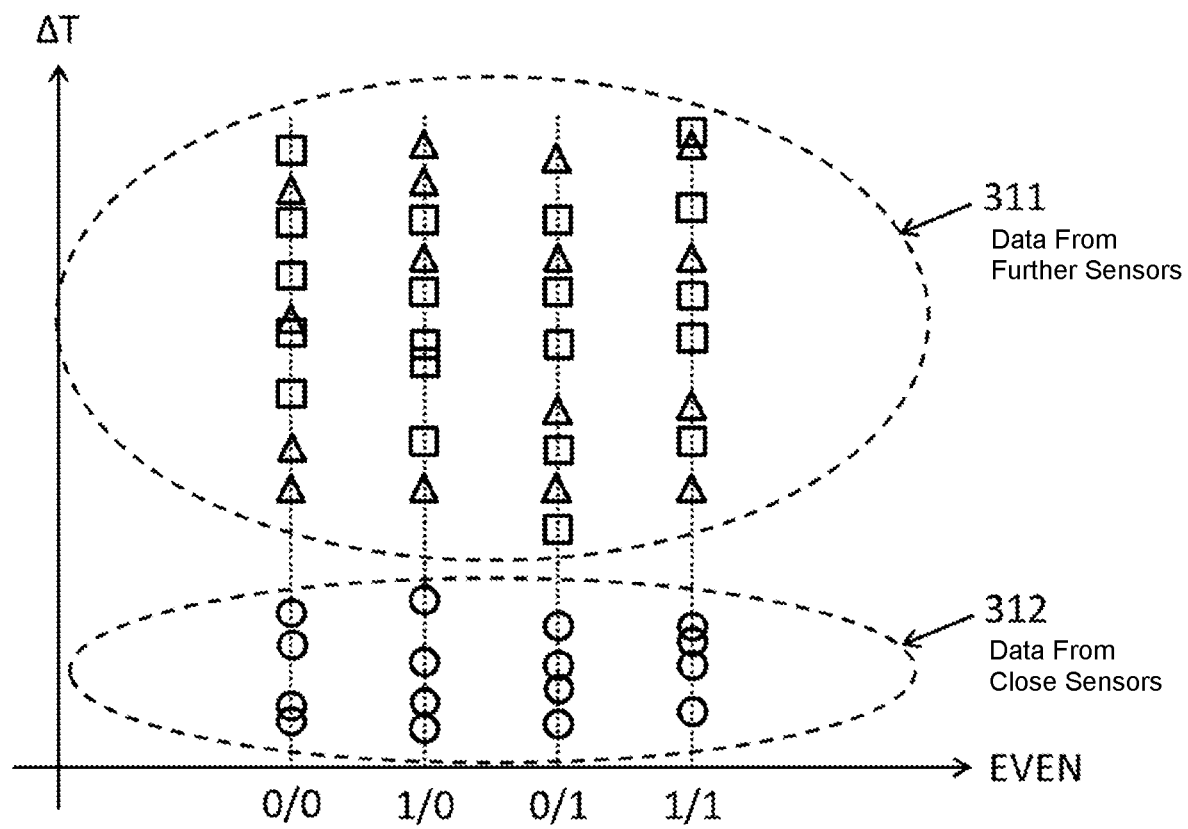
FIG. 3b represents a sensor grouping according to one particular embodiment.

FIGS. 3a and 3b show a sensor grouping according to one possible embodiment of the disclosure.

In the illustrative example of FIG. 3a, the geographical area comprises two sub-areas 301 and 302, which here represent rooms of an apartment. Door 303 provides access to the first room 301 and door 304 provides access to the second room 302. A communicating door 305 connects one room to another. Each room comprises two motion sensors, 306, 307 in the first room and 308, 309 in the second room. For each room, one of the sensors 306, 308 is situated at the entrance to the room next to the door 303, 304. The other sensor 307, 309 is situated at an end of the room opposite the connecting door 305. An example of a path traveled by an individual is represented with dashed lines in FIG. 3. It is assumed that the positions of sensors 306 and 308 are known, and that the positions of sensors 307 and 309 are unknown.

In one embodiment, when an individual passes near a motion sensor 306, 307, 308, 309, the sensor sends data to the location device indicating that it has been activated ("ON" notification). If the sensor is not reactivated within a predefined time interval (for example 5 seconds), it sends data to the location device indicating that it has not been reactivated ("OFF" notification). According to one embodiment, it is possible to take a sensor whose location is known as a reference sensor, for example sensor 306. Each piece of data ("ON" or "OFF" notification) can be associated with a respective time (time sent, time received by the location device, etc.). A notification sent by the reference sensor 306 is associated with a time, used as the reference time. Whenever a notification is received, the difference between the time associated with the sensor where the notification originated and the reference time is calculated. The differences can be used to determine locations of the sensors 307, 309 whose location is unknown.

Indeed, as shown in FIG. 3b, the time differences can be placed on a graph according to the different options for the variable under consideration (here "ON/OFF", or "1/0"), and the partitioning algorithm can be used. The result of applying the partitioning algorithm is represented in FIG. 3b by the dashed ellipses 311, 312. The data corresponding to sensor 307 situated in the same room 301 as reference sensor 306 are represented by circles (○), the data corresponding to sensors 308, 309 situated in the other room 302 are respectively represented by squares (□) and triangles (Δ). The four vertical lines represent the four possible combinations i/j of notifications ("1/0" for "ON/OFF") where i is the notification corresponding to the reference sensor 306 and j is the notification corresponding to another sensor 307, 308, 309. We see here in FIG. 3b that the partitioning algorithm has correctly grouped the notifications from sensor 307 in a same group 312, because the times separating the notifications from reference sensor 306 are close. The partitioning algorithm has also grouped the other sensors 308, 309 in a same group 311, without being able to distinguish the two sensors 308 and 309. Sensor 307 can then be associated with sub-area 301 (in other words that of reference sensor 306, which is known to belong to sub-area 301), and sensor 309, which belongs to the same group as sensor 308, can then be associated with sub-area 302 (in other words that of sensor 308, which is known to belong to sub-area 302).

Of course, the above example is purely illustrative. The concept of an "ON/OFF" notification can be extended to any binary variable obtained from a sensor as mentioned above, regardless of the type of sensor, or from physical measurements. It is also possible to perform the grouping based only on activation data ("ON" notifications). Any other configuration of the geographical area and sub-areas besides those in FIG. 3a are possible. In addition, it is not necessary to choose a time reference corresponding to a sensor.

Other alternative or complementary embodiments exist for grouping the sensors. It is possible to obtain information from an external entity which allows grouping sensors. For example, if there is a power failure in some rooms of a building and the location device receives data from a sensor, it can eliminate the rooms affected by the power failure as possible locations. It is also possible to correlate data of the same nature, i.e. corresponding to similar physical parameters. For example, if two temperature sensors send different temperature measurements to the device, the device can deduce that the two sensors are situated in different sub-areas.

Figure 4:
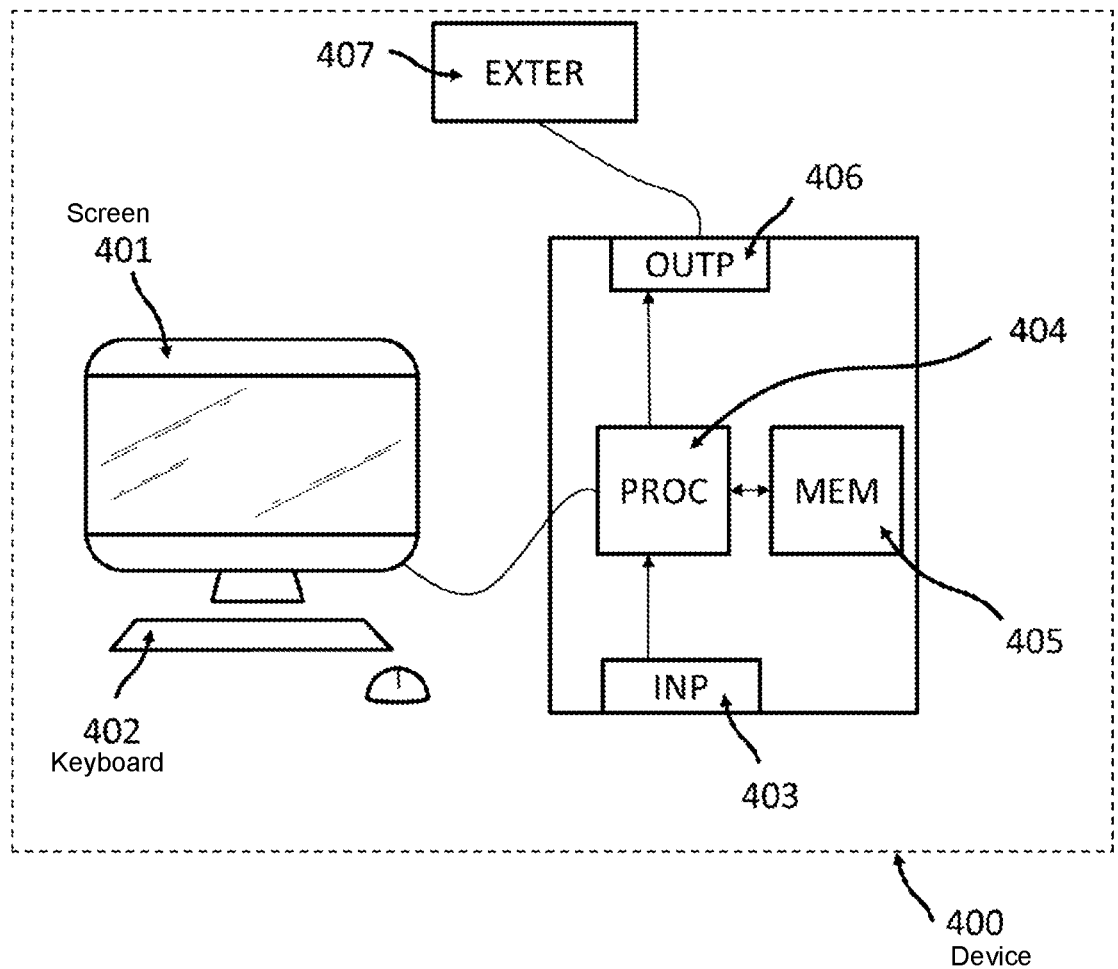
FIG. 4 represents an example of a device for locating a sensor according to one particular embodiment.

FIG. 4 shows an example of a device for locating a sensor in one embodiment of the disclosure.

In this embodiment, the device 400 comprises a memory 405 for storing instructions for implementing the method, the measurement data received, and temporary data for carrying out the various steps of the method as described above.

The device further comprises a circuit 404. This circuit may be, for example:
a processor able to interpret instructions in the form of a computer program, or
a circuit board in which the steps of the method of the disclosure are defined in the silicon, or
a programmable electronic chip such as an FPGA (for "Field-Programmable Gate Array"), a SOC (for "System On Chip"), or an ASIC (for "Application Specific Integrated Circuit").

SOCs or systems-on-chip are embedded systems that integrate all components of an electronic system into a single chip.

An ASIC is a dedicated electronic circuit that groups custom features for a given application. ASICs are usually configured during their manufacture and can only be simulated by the user.

Programmable logic circuits such as a Field Programmable Gate Array (FPGA) are electronic circuits reconfigurable by the user.

This device comprises an input interface 403 for receiving data from the sensors, and an output interface 406 for supplying control signals to control an external device 407. Finally, to allow easy interaction with a user, the device may comprise a screen 401 and a keyboard 402. Of course, the keyboard is optional, particularly when the device corresponds to a computer in the form of a touchpad, for example.

Depending on the embodiment, the device 400 may be a computer, a network of computers, an electronic component, or some other device having a processor operatively coupled to a memory, as well as, depending on the chosen embodiment, a data storage unit, and other associated hardware elements such as a network interface and a media player for reading and writing on a removable storage medium (not represented in the figure). The removable storage medium may be, for example, a compact disc (CD), a digital video/versatile disc (DVD), a flash drive, a USB key, etc.

Depending on the embodiment, the memory, the data storage unit, or the removable storage medium contains instructions which, when executed by the control circuit 404, cause this control circuit 404 to provide or control the input interface 403, output interface 406, data storage in memory 405, and/or data processing portions of the exemplary embodiments of the proposed method described herein.

The control circuit 404 may be a component which implements the control of units 403, 405 and 406 of the device 400.

Furthermore, the device 400 may be implemented in software form, in which case it takes the form of a program executable by a processor; or in hardware form as an application-specific integrated circuit (ASIC) or a system-on-a-chip (SOC); or in the form of a combination of hardware and software, such as a software program intended to be loaded and executed on an electronic component described above (for example an FPGA, a processor).

The device 400 may also use hybrid architectures, for example architectures based on a CPU+FPGA, a GPU (Graphics Processing Unit), or an MPPA (Multi-Purpose Processor Array).

The block diagram shown in FIG. 2 is a typical example of a program in which some instructions can be carried out in the described device. In this case, FIG. 2 can correspond to the flowchart of the general algorithm of a computer program within the meaning of the disclosure.

Of course, the present disclosure is not limited to the embodiments described above as examples; it extends to other variants. Other implementations are possible.

The invention claimed is:

1. A method, implemented by a device comprising at least one hardware component, for locating sensors situated in a geographical area, said geographical area comprising at least one reference sub-area, said sensors comprising:

at least one located sensor defined as being situated in a respective reference sub-area and as having an identifier associated, in a lookup table stored in a memory, with said respective reference sub-area; and at least one unlocated sensor defined as having an identifier for which a location is not known in the lookup table;

the method comprising:

receiving data from the sensors located in the geographic area, and:

a) grouping said sensors into a plurality of groups of spatially close sensors by partitioning the data received from said sensors based on spatial correlations established on the basis of said data from said sensors;

b) for at least one group of sensors among the plurality of groups, determining whether or not the group comprises a located sensor of the at least one located sensor by checking in the lookup table; and c) when the device determines that the group comprises a located sensor of the at least one located sensor, associating each of the at least one unlocated sensor of the group with the reference sub-area with which the located sensor of the group is associated, by updating the lookup table, and when the device determines that the group comprises only unlocated sensors, issuing a signal to request information relating to a reference sub-area of the at least one reference sub-area in which each unlocated sensor of the group is situated.

2. The method according to claim 1, further comprising:

d) generating a signal for operating an electronic device on the basis of information relating to the reference sub-area associated with an identifier of at least one sensor.

3. The method according to claim 1, wherein, for a subset of data among said data from said sensors, each piece of data of the subset is respectively associated with an event time, the partitioning of said data from said sensors being based on temporal correlations established on the basis of said event times.

4. The method according to claim 3, wherein at least one piece of data of the subset of data comes from at least one located sensor among said located sensors, the method further comprising:

selecting a reference sensor among said at least one located sensor;

determining differences between event times associated with sensors other than the reference sensor and an event time associated with the reference sensor;

wherein the act of grouping of the sensors into a plurality of groups is carried out on the basis of the determined differences.

5. The method according to claim 1, wherein the act of grouping of said sensors comprises:

grouping said located sensors into a plurality of first groups, wherein all located sensors belonging to a same first group among the plurality of first groups are associated with a same sub-area of the geographical area and wherein two located sensors among said located sensors associated with two different respective sub-areas of the geographic area do not belong to a same first group;

on the basis of the data from the sensors, adding an unlocated sensor to a first group among said first groups, or to a created group not comprising any located sensor.

6. The method according to claim 1, wherein the sensors of the geographical area belong to a same local area network, wherein a) to c) are implemented at each detection of the addition of a new sensor to the local area network and at each removal of a sensor from the local area network for which data was previously received.

7. The method according to claim 1, further comprising:

receiving a signal confirming or correcting that a respective unlocated sensor of the group belongs to the reference sub-area of the at least one reference sub-area;

updating the plurality of groups of sensors and the respective reference sub-areas associated with the plurality of groups of sensors according to the validation or correction signal received.

8. The method according to claim 1, wherein the received data are associated with sensors measuring different physical parameters.

9. A device for locating sensors situated in a geographical area, said geographical area comprising at least one reference sub-area, said sensors comprising:

at least one located sensor defined as being situated in a respective reference sub-area and as having an identifier associated, in a lookup table stored in a memory, with said respective reference sub-area; and at least one unlocated sensor defined as having an identifier for which a location is not known in the lookup table;

the device comprising a circuit configured to receive data from the sensors located in the geographic area, and:

a) group said sensors into a plurality of groups of spatially close sensors by partitioning the data received from said sensors based on spatial correlations established on the basis of said data from said sensors;

b) for at least one group of sensors among the plurality of groups, determine whether or not the group comprises a located sensor of the at least one located sensor by checking in the lookup table; and c) when the circuit determines that the group comprises a located sensor of the at least one located sensor, associate each of the at least one unlocated sensor of the group with the reference sub-area with which the located sensor of the group is associated, by updating the lookup table, and when the circuit determines that the group comprises only unlocated sensors, issue a signal to request information relating to a reference sub-area of the at least one reference sub-area in which each unlocated sensor of the group is situated.

10. A non-transitory computer-readable medium comprising instructions stored thereon for implementing a method for locating sensors situated in a geographical area, when this program is executed by a processor of a device, said geographical area comprising at least one reference sub-area, said sensors comprising:

at least one located sensor defined as being situated in a respective reference sub-area and as having an identifier associated, in a lookup table stored in a memory, with said respective reference sub-area; and at least one unlocated sensor defined as having an identifier for which a location is not known in the lookup table;

wherein the instructions configure the device to receive data from the sensors located in the geographical area, and:

a) group said sensors into a plurality of groups of spatially close sensors by partitioning data from said sensors based on spatial correlations established on the basis of said data from said sensors;
b) for at least one group of sensors among the plurality of groups, determine whether or not the group comprises a located sensor of the at least one located sensor by checking in the lookup table; and
c) when the device determines that the group comprises a located sensor of the at least one located sensor, associate each of the at least one unlocated sensor of the group with the reference sub-area with which the located sensor of the group is associated, by updating the lookup table, and when the device determines that the group comprises only unlocated sensors, issue a signal to request information relating to a reference sub-area of the at least one reference sub-area in which each unlocated sensor of the group is situated.

* * * * *